US009567543B2

(12) United States Patent
Catto et al.

(10) Patent No.: US 9,567,543 B2
(45) Date of Patent: Feb. 14, 2017

(54) SYSTEM AND METHOD USING A HORIZONTAL SUBLIMATION CHAMBER FOR PRODUCTION OF FUEL FROM A CARBON-CONTAINING FEEDSTOCK

(71) Applicants: Michael L. Catto, Moore, SC (US); Douglas M. Van Thorre, Minneapolis, MN (US)

(72) Inventors: Michael L. Catto, Moore, SC (US); Douglas M. Van Thorre, Minneapolis, MN (US)

(73) Assignee: Tekgar, LLC, Moore, SC (US)

( * ) Notice: Subject to any disclaimer, the term of this patent is extended or adjusted under 35 U.S.C. 154(b) by 649 days.

(21) Appl. No.: 14/033,435

(22) Filed: Sep. 21, 2013

(65) Prior Publication Data

US 2015/0083571 A1 Mar. 26, 2015

(51) Int. Cl.
| | |
|---|---|
| *C10B 47/44* | (2006.01) |
| *C10L 3/08* | (2006.01) |
| *C10B 1/06* | (2006.01) |
| *C10L 5/40* | (2006.01) |
| *C10L 5/44* | (2006.01) |
| *C10B 53/02* | (2006.01) |
| *C10L 9/08* | (2006.01) |
| *C10L 5/36* | (2006.01) |

(52) U.S. Cl.
CPC . *C10L 3/08* (2013.01); *C10B 1/06* (2013.01); *C10B 47/44* (2013.01); *C10B 53/02* (2013.01); *C10L 5/406* (2013.01); *C10L 5/447* (2013.01); *C10L 9/08* (2013.01); *C10L 5/363* (2013.01); *C10L 2290/02* (2013.01); *C10L 2290/30* (2013.01); *C10L 2290/50* (2013.01); *Y02E 50/10* (2013.01); *Y02E 50/14* (2013.01); *Y02E 50/30* (2013.01)

(58) Field of Classification Search
CPC .............. C10B 1/06; C10B 7/10; C10B 29/04;
C10B 47/44; C10B 53/02; C10B 57/16;
C10B 57/18; C10J 3/66; C10L 3/08; C10L
5/406; C10L 5/447; C10L 9/08
USPC .. 202/112, 114, 118, 137, 268, 269; 48/119;
110/229; 277/510
See application file for complete search history.

(56) References Cited

U.S. PATENT DOCUMENTS

| 1,409,897 A | 3/1922 | Murphy et al. |
|---|---|---|
| 2,743,169 A | 4/1956 | Hecker |
| 3,020,212 A * | 2/1962 | Lantz .................... C10L 347/44 |
| | | 202/118 |

(Continued)

OTHER PUBLICATIONS

Pyrolysis from Wikipedia.org on Jul. 1, 2013.

(Continued)

*Primary Examiner* — Jill Warden
*Assistant Examiner* — Joye L Woodard
(74) *Attorney, Agent, or Firm* — Berggren Law Offices, LLC; William R. Berggren; Stephen F. Wolf

(57) ABSTRACT

Systems and methods for producing product gas fuel and solid char fuel from a carbon-containing feedstock are described. Feedstock is introduced into and transported through at least one substantially horizontal sublimation reaction chamber. An initial and final sublimation temperature is maintained within less than ±10° C. in an atmosphere free from external oxygen and externally supplied catalyst. The system is configured to not have any product gas leak out of the reaction chamber or oxygen leak into a hot box configured to heat the reaction chamber.

22 Claims, 12 Drawing Sheets

(56) References Cited

U.S. PATENT DOCUMENTS

| | | | |
|---|---|---|---|
| 5,050,511 A | 9/1991 | Hallett et al. | |
| 5,205,225 A * | 4/1993 | Milsap, III | C10B 7/10 |
| | | | 110/229 |
| 5,636,580 A * | 6/1997 | Kanis | C10B 7/10 |
| | | | 110/255 |
| 5,868,085 A * | 2/1999 | Hansen | C10B 7/10 |
| | | | 110/229 |
| 6,216,613 B1 | 4/2001 | Wachendorfer | |
| 7,000,551 B2 * | 2/2006 | Cole | C10B 47/44 |
| | | | 110/229 |
| 7,294,208 B2 | 11/2007 | Guenther | |
| 8,343,241 B2 | 1/2013 | Hallett et al. | |
| 2009/0232725 A1 | 9/2009 | Aaron | |
| 2010/0037835 A1 | 2/2010 | Betzer Tsilevich | |
| 2010/0055026 A1 | 3/2010 | Aaron | |
| 2010/0266908 A1 | 10/2010 | de Graffenried, Sr. | |
| 2011/0180382 A1 | 7/2011 | Hayward | |
| 2012/0321526 A1 | 12/2012 | Hernandez et al. | |
| 2013/0041199 A1 | 2/2013 | Hernandez et al. | |

OTHER PUBLICATIONS

Abdulrazzaq, H., et al., Biochar from Empty Fruit Bunches, Wood, and Rice Husks: Effects on Soil Physical Properties and Growth of Sweet Corn on Acidic Soil, Journal of Agricultural Science, vol. 7 (1) (2015), pp. 192-200.

Mohan, D. et al., "Pyrolysis of Wood/Biomass for Bio-oil: A Critical Review", Energy & Fuels, vol. 20 (2006), pp. 848-889.

Jahirul, M. I., et al., Biofuels Production through Biomass Pyrolysis—A Technological Review, Energies, vol. 5 (2012), pp. 4952-5001.

Sadaka, S., et al., "Pyrolysis and Bio-oil", University of Arkansas, United States Department of Argiculture, publication FSA1052 (2014).

Hardie, M., et al., "Does Biochar Influence Soil Physical Properties and Soil Water Availability?", Tasmanian Institute of Agriculture Paper of the Month, Monday 24, 2014, available online at www.tia.tas.edu.au.

Zacher, A., et al., "Direct Thermochemical Liquifaction", EA Bioenergy Task 34, Jan. 2016.

* cited by examiner

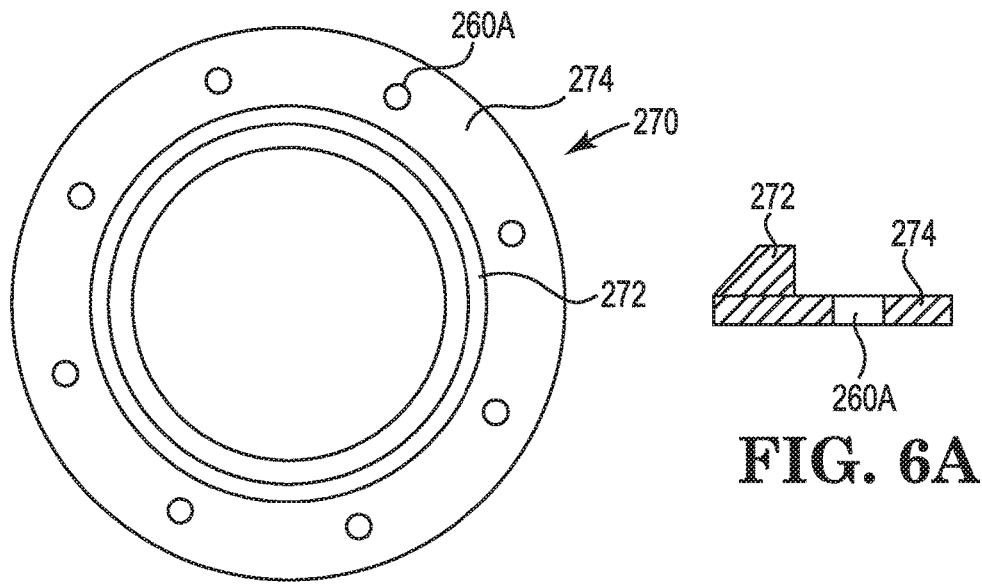
FIG. 6
FIG. 6A
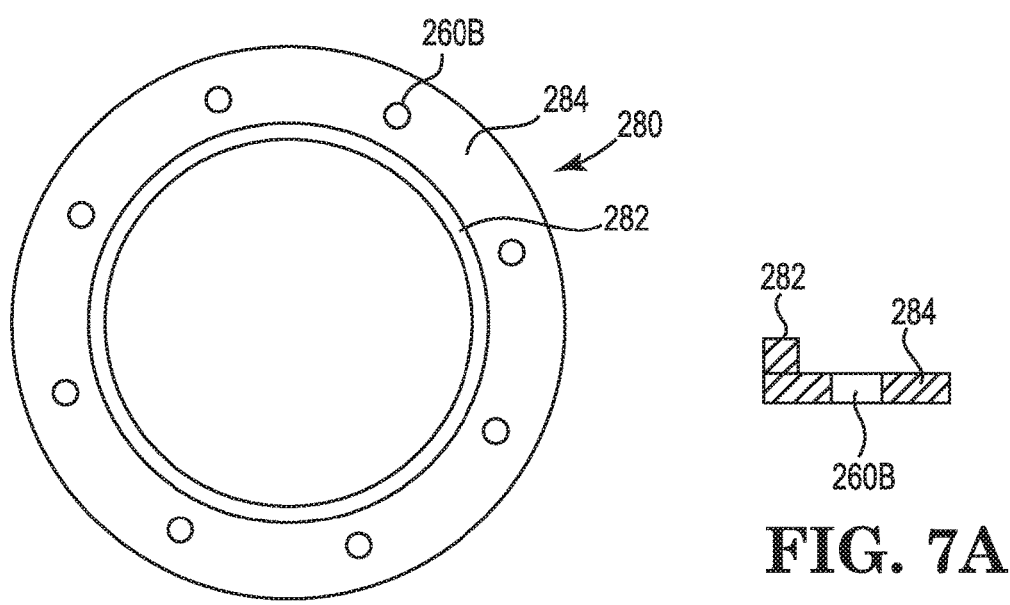
FIG. 7
FIG. 7A

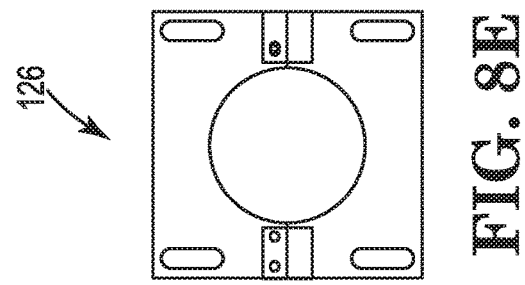
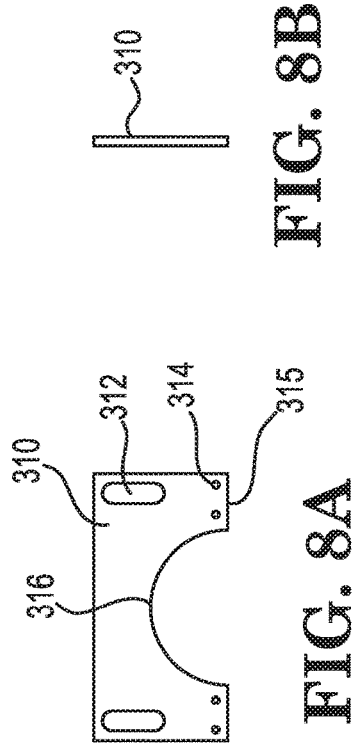
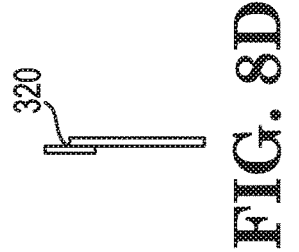
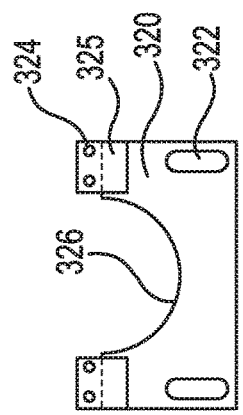

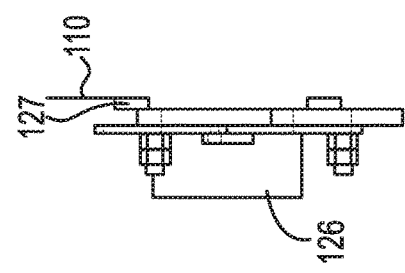
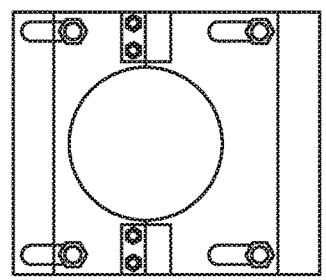
FIG. 9A COLD POSITION  FIG. 9B
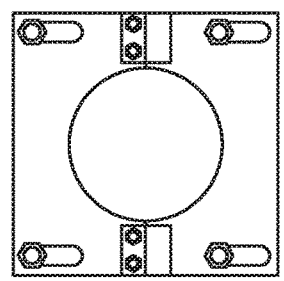
FIG. 10A HOT POSITION  FIG. 10B

SYSTEM AND METHOD USING A HORIZONTAL SUBLIMATION CHAMBER FOR PRODUCTION OF FUEL FROM A CARBON-CONTAINING FEEDSTOCK

FIELD OF THE INVENTION

The present invention relates generally to the production of fuel from a carbon-containing feedstock.

BACKGROUND OF THE INVENTION

Natural gas and crude oil are the sourced of the vast majority of fuels used today. These sources are obtained from limited underground reserves. As the earth's natural gas and crude oil supplies are depleted, the world-wide demand for energy is simultaneously growing. Over the next ten years, depletion of the remaining world's easily accessible natural gas and crude oil reserves will lead to a significant increase in cost for fuel obtained from them.

Syngas, or synthesis gas, is a fuel gas mixture consisting primarily of hydrogen, carbon monoxide, and very often some carbon dioxide. It is commonly used as an intermediate in creating synthetic natural gas, synthetic petroleum, and products to drive gas turbines. Production methods include the gasification of carbon-containing biomass such as, for example, gasification of agricultural waste and municipal waste. However, syngas has less than half the energy density of natural gas and the carbon monoxide and carbon dioxide created are considered harmful contributors to global warming.

The search to find processes that can efficiently convert renewable materials to fuels suitable for transportation, generation of electricity, and/or heating is an important factor in meeting the ever-increasing demand for energy. Methods and systems for efficiently converting carbon-based feedstocks such as biomass into gaseous fuel with energy densities on the order at least that of natural gas are needed. The present invention fulfills these needs and provides various advantages over the prior art.

SUMMARY OF THE INVENTION

Embodiments of the present are directed to a system for producing fuel from a carbon-containing feedstock. The system comprises a hot box, at least one reaction chamber, a first powered transport mechanism, and gas-tight elements. The hot box is configured to be able to heat from an ambient temperature to an operating sublimation temperature, maintain an initial operating sublimation temperature and a final operating sublimation temperature that are stable within less than ±10° C., and cool from operating sublimation temperatures to an ambient temperature without leaking any oxygen into the hot box and having at least one heat source in communication with the interior of the hot box to supply heat as needed. The at least one reaction chamber is substantially horizontal, located largely within the hot box, has a surface, and is configured to heat the solid carbon-containing feedstock without external catalyst or additional water to an operating sublimation temperature in a time frame that is short enough to sublime at least part of the solid carbon-containing feedstock without creating substantially any liquid. Also it is configured to heat from an ambient temperature to an operating sublimation temperature, operate at a sublimation temperature, and cool from an operating sublimation temperature to an ambient temperature without leaking any product gas fuel into the surrounding hot box.

Further, it comprises an input end outside the hot box and configured to receive compressed feedstock through an input line and an output end outside the hot box and configured to discharge product gas fuel gas through a discharge line and solid char fuel through an output line. The first powered transport mechanism is located within the reaction chamber and is configured to convey sublimation products of the solid carbon-containing feedstock through the reaction chamber as the solid carbon-containing feedstock is transformed into product gas fuel and solid char fuel. The gas-tight element is on both the input line and output line and configured to prevent hot product fuel gas from adversely escaping from the reaction chamber.

Another embodiment of the invention involves a process for converting a carbon-containing compound to product gas fuel and solid char fuel. The process comprises at least four steps. The first step is inputting solid carbon-containing feedstock into a substantially horizontal sublimating reaction chamber largely contained within a hot box and configured to be able to heat from an ambient temperature to an operating sublimation temperature, operate at a sublimation temperature, and cool from a operating sublimation temperature to an ambient temperature without leaking any hot product gas fuel from the reaction chamber into the hot box or atmosphere, or leaking any oxygen from outside the hot box into the hot box. The second step is heating solid carbon-containing feedstock to a sublimating temperature before it is able to form a liquid phase. The third step is maintaining the temperature at a sublimation temperature for a residence time that is as long a time as needed to convert the carbon-containing feedstock to product gas fuel and solid char fuel. The fourth step is separating the product gas fuel from the solid char fuel.

The above summary is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 6 and 6A are diagrams of a front view and side view respectively of an element of the embodiment of FIG. 3 showing a cover that compresses the double rope seal shown in FIG. 4.

FIGS. 7 and 7A are diagrams of a front view and side view respectively of an element of the embodiment of FIG. 3 showing a cover that compresses the single rope seal of FIG. 3C shown in FIG. 5.

FIGS. 8A and 8B are diagrams of the front view and side view respectively of an embodiment of the high temperature adjustable cover plate showing a top half.

FIGS. 8C and 8D are diagrams of the front view and side view respectively of the embodiment of the high temperature adjustable cover plate shown in FIG. 8A showing a bottom half.

FIG. 8E is a diagram of the front view of the embodiment of the high temperature adjustable cover plate of FIG. 8A showing the top half of FIG. 8A and the bottom half of FIG. 8C joined.

FIGS. 9A and 9B are diagrams of the front view and side view respectively of the assembled high temperature adjustable cover plate in the cold temperature position.

FIGS. 10A and 10B are diagrams of the front view and the side view respectively of the assembled high temperature adjustable cover plate in the hot temperature position.

Figure 1:
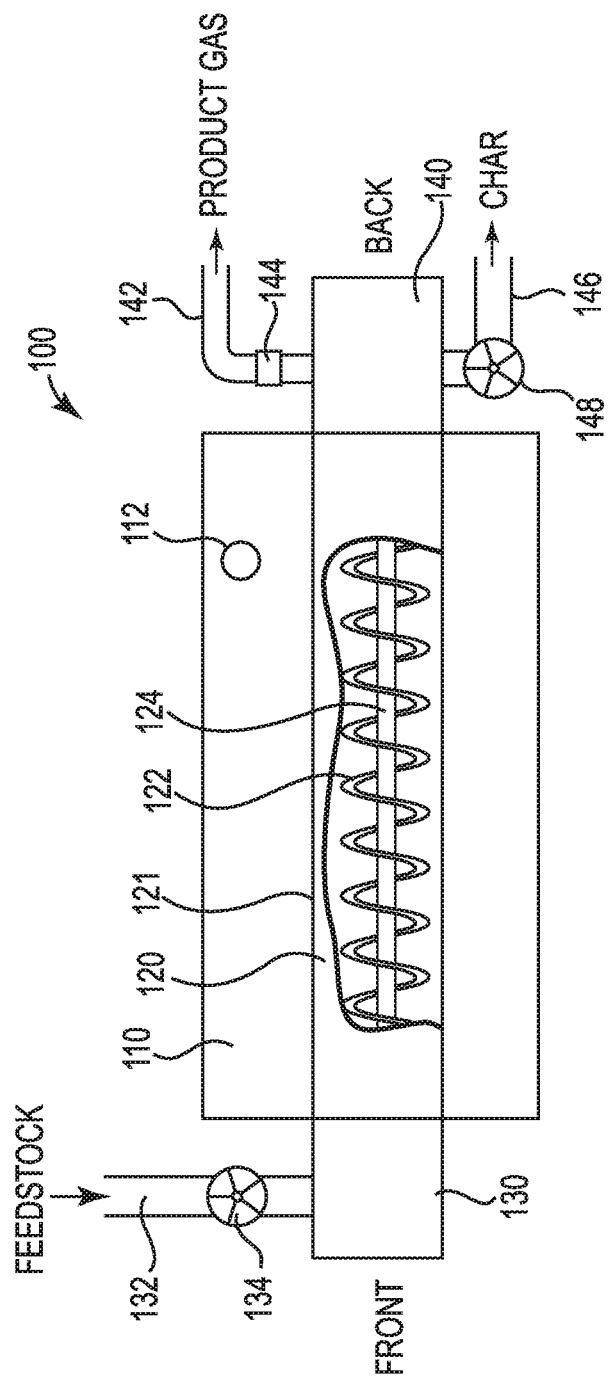
FIG. 1 is a diagram of a side view of an embodiment of a system with a reactor chamber having one pass.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings forming a part hereof, and in which are shown by way of illustration, various embodiments by which the invention may be practiced. It is to be understood that other embodiments may be utilized and structural and functional changes may be made without departing from the scope of the present invention.

The following description relates to approaches for processing solid carbon-containing feedstock into gaseous product fuel and a residual solid char fuel by a sublimation mechanism. The gaseous fuel is primarily methane but also may include ethane, propane, and butane depending on the nature of the solid carbon-containing feedstock and the residence times employed during the sublimation process. Solid char fuel is the solid carbon-based residue that is unable to be converted into gaseous product fuel. Solid carbon-containing feedstock for the purposes of this document does not include coal but does include all other forms of carbon-containing feedstock including, for example, manufactured non-renewable content and biological renewable content. Manufactured non-renewable content is man-made carbon-containing waste such as, for example, plastics, tires, cardboard, and manufactured elements made at least in part of wood or other cellulosic material. The process of the invention converts feedstocks like these into a gaseous product fuel and a solid char fuel called industrial char, i.e., char made from carbon-containing feedstocks that are not renewable. Biological renewable content is carbon-containing feedstock that is renewed over a matter of several months to several years and includes solid renewable carbon-containing material such as agricultural waste such as one or more of wheat straw, rice straw, energy crops, grasses, stalks and stems of plants, crop residue, plant-based cellulose, tree branches and wooden products; and animal waste such as manure. The process of the invention converts feedstocks like these into a gaseous product fuel and a solid char fuel called biochar, i.e., char made from carbon-containing feedstocks that are renewable. For the purposes of this document, peat is considered non-renewable content carbon-containing feedstock as it takes much longer than several years for nature to form peat from biological renewable content feedstock.

Methane is important for electrical generation by burning it as a fuel in a gas turbine, gas reciprocating engine, or steam boiler. Compared to the hydrocarbon fuels, burning methane produces less carbon dioxide, a gas associated with global warming, for each unit of heat released. At about 891 kJ/mol, methane's heat of combustion is lower than any other hydrocarbon but the ratio of the heat of combustion to the molecular mass of 16 g/mo. (of which 12 g/mol is carbon) shows that methane, being the simplest hydrocarbon, produces more heat per mass unit, 55.7 kJ/g, than any other complex hydrocarbon. Methane as a fuel is generally known as natural gas because natural gas is predominately methane with lesser amounts of ethane, propane, and butane and has an energy content of 39 megajoules per cubic meter or 1,000 BTU per standard cubic foot.

Natural gas can be found in virtually all forms of biomass. Natural gas can be found in plant and animal residue ranging from fresh collections to collections many millions of years old. It can also be found in mad-made products such as, for example, plastics, and paper products. The question is generally not where one should go to look for natural gas but rather how to liberate it.

In general, a gasification process consists of the combustion of a carbon-containing feedstock to create hot gases that can be used to run a gas turbine generator or used to convert water to steam to run a steam generator. The combustion process is a phase changing process that passes through a liquid state and creates carbon dioxide and water from the carbon compounds in the carbon-containing feedstock and corrosive nitrogen and sulfur compounds from nitrogen and sulfur compounds typically in the carbon-containing feedstock. While coal is a common source of carbon-containing feedstock, because of its high heat content, other sources such as natural gas, wood, and agricultural waste may be used for availability reasons. However, recent concern for green house gases, such as carbon dioxide, is turning public opinion away from gasification as a desirable means for generating electricity.

Another process is sublimation, a high temperature method of converting a solid to a gas cleanly without passing through a liquid state, a passage that can result in many side reactions discussed above under gasification. The key to sublimation is to expose the solid to a high temperature in the absence of free water and in a substantially oxygen free atmosphere. Under sublimation, the methane groups separate from a carbon chain without breaking down to carbon dioxide and water. However, because this process requires such high temperatures, it has not been found to be energy efficient. Sublimation is an endothermic process. At least as much energy is used to heat the carbon-containing feedstock to a sublimation temperature as is in the resulting output methane. For the purposes of this document, methane, product gas fuel, and natural gas product gas fuel will be used interchangeably.

This invention comprises an apparatus aspect and method aspect that is sufficiently energy efficient that the sublimation is a practical way to produce methane for energy uses such as, for example, running a gas turbine. In addition, the apparatus can be scaled down to a size that makes it convenient to process the agricultural waste of a farm to generate electricity with a companion gas turbine to supply the electricity needs for a neighboring small town. Similar benefits can be obtained from a municipality by using its biomass garbage as a carbon-containing feedstock. In addition, a municipality that uses the apparatus to process municipal waste can reduce the area of land needed for landfills and reduce the adverse green-house causing carbon dioxide generated by incinerators during the gasification of the waste while at the same time create useful product gas fuel and solid biochar fuel.

The system aspect comprises a substantially horizontal sublimator for processing carbon-containing feedstock ranging from low-density or low weight per unit of volume to high density of high weight per unit volume. Examples of low density carbon-containing feedstock are typically biological renewable carbon-containing materials and include, for example, wheat and rice straw, energy crops, grasses, stalks and stems of plants, crop residue, plant-based cellulose, and tree branches. Low density carbon-containing feedstocks will need to be compressed or densified to increase the density so that enough carbon-containing feedstock can be processed per unit of time so as the product can be priced competitively in the energy market. Examples of high-density carbon-containing feedstock typically are manufactured non-renewable carbon-containing materials and include, for example, plastic, tires, cardboard, and manufactured elements made at least in part of wood or other cellulosic material. These materials are often associated with landfills, and municipal solid waste. High density feedstock needs to be reduced in particle size to permit sublimation in a short enough time to be economical. Care must be taken to control process conditions to avoid high density carbon-containing feedstock forming liquid tar on the walls of the sublimator.

The overall process will now be discussed for using a substantially horizontal sublimator to efficiently convert carbon-containing feedstock to product gas fuel and solid char fuel. The process will be discussed briefly for an embodiment that needs carbon-containing feedstock preparation, drying and compression, and uses an apparatus with two reaction chambers and burners to deliver sublimation heat. The apparatus and method of the invention will be discussed in more detail later. Briefly, the sublimation process of this embodiment of the invention comprises a preparation step, a drying step, a compression step, a sublimation step, and a separation step. Carbon-containing feedstock preparation will be dictated by the physical characteristics of the carbon-containing feedstock being considered for processing/conversion such as its water content and physical characteristics such as size and thickness. Size reduction of carbon-containing feedstock will enhance the compressibility of the carbon-containing feedstock to allow for maximum throughput in the reaction chamber. In some embodiments, sizes are of a volume that is less than the equivalent of a cube about 2 cm (about 0.75 in) on a side with a length in any one direction of no more than about 5 cm (about 2 in).

After the carbon-containing feedstock is properly prepared, it will then pass through a gas-tight element on an input line into a substantially horizontal drying chamber with an internal auger and be treated with recycled heat from the downstream process to drive off as much free water as possible. Reducing the free water content will increase the heat absorption by the carbon-containing feedstock and reduce the amount of oxygen present by the water inside the sublimation reaction chamber and the finished product gas fuel. Reducing the free water and the oxygen the product gas fuel contains will result in less carbon dioxide and monoxide in the product gas fuel that is desirable to increase its energy content.

After the drying chamber, the carbon-containing feedstock will pass into a compression chamber containing a compression screw that is designed to compress the carbon-containing feedstock to the desired density. This compression further decreases any free water remaining. It also removes entrained air in the carbon-containing feedstock that also will minimize the oxygen present in the sublimation reaction chamber. This dewatered, de-aired, and densified carbon-containing feedstock will enter the reaction chamber.

The compression chamber develops a feedstock plug at its exit that enters the reaction chamber. This plug acts as a partial barrier or seal so a minimal amount of gases produced in the reaction chamber backflow and escape. The gas-tight element on the input line prevents the rest of the gases from escaping the system.

In the embodiment being discussed, the sublimator's physical plant is a three dimensional, rectangular box with an internal substantially horizontal reaction chamber running along the top, a drop passage, and then a second substantially horizontal reaction chamber in the reverse direction of the top reaction chamber. Each reaction chamber contains its own auger for transporting the feedstock, is continuous, and is completely sealed against the escape of any hot product gas fuel.

In this embodiment, burners are external to the heating box but attached to it and will heat the space between the inside wall of the heating box and the outside walls of the reaction chamber configuration so that there will be no intermingling of the heated transfer air heating the external surface of the reaction chamber and the contents of the carbon-containing feedstock in the reaction chamber undergoing sublimation. All the internal surfaces of the heating box are lined with high thermal insulating material so as to minimize heat loss and minimize the internal reactor air space.

After the compression screw, the carbon-containing feedstock plug now enters the reaction chamber. The reaction chamber containing an auger inside of it that may be inside of a tube vented to a head space above the tube but within the reaction chamber for aggregation of the gases that are generated. The auger propels and rotates the carbon-containing feedstock so that it is evenly exposed to the sidewalls of the tube or reaction chamber for efficient heat exchange and to 'turn over' the feedstock for even heating. The reaction chamber is heated from the outside surface of the reaction chamber so the transfer heats the air and any combustion products from the burners do not get intermingled with the carbon-containing feedstock and/or product gas fuel. The reaction chamber is constructed to prevent the leaking out of any hot gases.

The carbon-containing feedstock is then augured down the length of the reaction chamber. At the end of the reaction chamber, the carbon-containing feedstock drops down into a second augured reaction chamber that is of the same design as the first reactor tube. The configuration of the three, chambers including the connecting passage looks like a U rotated 90 degrees to the left.

The carbon-containing feedstock has now been reduced to nonvolatilized carbon and volatile gases. The volatile gases are passing and mixing with the hot carbon surfaces and reacting with it to form a hot product gas fuel. The residence time in the both of the reaction chambers allows the volatile gases created during the sublimation to disassociate and move down the reaction chambers.

At the end of the second reactor chamber are two outlets. One outlet is for the nonvolatized carbon to pass through a gas-tight mechanism and be collected as solid char fuel and the second outlet is for the product gas to be captured. The product gas is filtered and allowed to cool and reassociate into the final product gas fuel and then stored.

More specifically, the apparatus aspect of the invention comprises a system that includes a hot box, at least one reaction chamber, a first powered transport mechanism, and gas-tight elements. The hot box is configured to be able to heat from an ambient temperature to an operating sublimation temperature, maintain an initial operating sublimation temperature and a final operating sublimation temperature that are stable within less than ±10° C., and cool from operating sublimation temperatures to an ambient temperature without leaking any oxygen into the hot box and having at least one heat source in communication with the interior of the hot box to supply heat as needed.

The temperature needed to sublime carbon-containing feedstock depends on the individual feedstock. If an operating temperature is too low, a liquid forms during the phase change from solid to gas with accompanying adverse reactions discussed above and associated with gasification processes. If the temperature is too high, energy is wasted in an already endothermic reaction. Operating sublimation temperatures are typically between 600° C. and 850° C. More common low density carbon-containing feedstocks have operating sublimation temperatures between 650° C. and 750° C.

For the above reasons, the operating temperature in the reaction chamber should be reasonably stable during operation of the apparatus. In some embodiments where the reaction chamber has a shorter length and the flowrate of the carbon-containing feedstock is smaller, the operating temperature may be substantially constant within less than ±10° C. In other embodiments having a longer residence time and a larger carbon-containing feedstock throughput, the reaction chamber may not be constant but rather forms a profile through the reaction chamber drops from the beginning to the end. In these embodiments, for energy efficiency reasons, the individual temperatures of the temperature profile through the reaction chamber should be stable during operation within less than ±10° C.

The heat source must be able to heat the inside of the hot box to a stable operating sublimation temperature and maintain that temperature during the operation of the apparatus. Heat sources may include any that can provide sufficient heat and include, for example, infrared sources, laser sources and combustion sources. Embodiments that use combustion sources have the additional advantage in that they can be fueled by some of the product gas fuel such that they require no additional energy from external sources. Such embodiments may be self sufficient during operation with as little as 10 percent of the product gas fuel that is created in the apparatus. This is due to the high energy content of the product gas fuel.

The at least one reaction chamber is substantially horizontal, located largely within the hot box, has a surface, and is configured to heat the solid carbon-containing feedstock without external catalyst or additional water to an operating sublimation temperature in a time frame that is short enough to sublime at least part of the solid carbon-containing feedstock without creating substantially any liquid. Also, it is configured to heat from an ambient temperature to an operating sublimation temperature, operate at a sublimation temperature, and cool from an operating sublimation temperature to an ambient temperature without leaking any product gas fuel into the surrounding hot box. Further, it comprises an input end outside the hot box and configured to receive compressed feedstock through an input line and an output end outside the hot box and configured to discharge product gas fuel through a pressure-isolation element and solid char fuel through an output line.

Sublimation is a reaction that strips smaller gaseous hydrocarbons from a solid carbon-based feedstock. The plasma re-associates into product gas fuel as it interacts with solid char fuel residue. Thus, there is no need for expensive external catalysts and subsequent elaborate reforming operations to create the product gas fuel. In addition, the sublimation of the invention is conducted in the presence of minimal oxygen since any oxygen reacts to cause non-fuel reaction products such as carbon dioxide. Thus it is desirable to not use superheated steam in contact with the carbon-containing feedstock to achieve operating sublimation temperature. Some oxygen that is interstitially locked in the cells of cellulose is unavoidable for carbon-containing feedstocks comprising wood or plants residue. In addition, other oxygen may enter through incomplete drying. However, these sources of oxygen comprise a small portion and contribute to less than 20 percent of the gaseous product and often less than 10 percent or 5 percent depending on the particular carbon-containing feedstock used.

To avoid passing through the liquid phase, the solid surface of the solid carbon-containing feedstock should reach the sublimation temperature immediately. In some embodiments, this is within 1 millisecond. In some embodiments, the time is within less than 0.1 millisecond. In still others it is within less than 0.01 millisecond.

Some embodiments have a single reaction chamber. These are constructed to withstand the temperature changes associated with passing from ambient to operating sublimation temperatures during start up operation and the reverse during shutdown operations. Features may include thicker walls and/or the use of supporting elements such as gussets where the conversion part of the reaction is in communication with the side of the hot box.

The first powered transport mechanism is located within the reaction chamber and is configured to convey sublimation products of the solid carbon-containing feedstock through the reaction chamber as the solid carbon-containing feedstock is transformed into product gas fuel and solid char fuel. Some embodiments have a reaction chamber that comprises a tube containing the first powered transport mechanism. The reaction chamber also has a head space in communication with the tube for the collection of product gas fuel as it is created. The first powered transport mechanism is configured to advance the solid portions of the solid portions of the carbon-containing feedstock, particularly the low-density forms of the carbon-containing feedstock. It is also configured to assist intermixing with the heat of the surface of the reaction chamber to assist in maintaining a stable operating sublimation temperature in contact with the solid parts of the feedstock as product gas fuel continues to be removed from the solid parts of the feedstock. The first transport mechanism is one that is able to effectively operate at a sublimation temperature and not be adversely impaired by thermal expansion and contraction during the starting up and cooling down phases of operation. One example of an effective first transport mechanism is in an augur.

The gas-tight element is on both the input line and output line and configured to prevent hot product fuel gas from adversely escaping from the reaction chamber. Leaks that permit product gas fuel to exit the reaction chamber in an unregulated manner can cause a serious safety concern. Combustible product gas fuel in the presence of hot surfaces can cause fires and explosions. Examples of gas-tight elements effective for this purpose at the temperatures discussed are a rotary valve, a rotary vacuum valve, and actuated double-gate valve.

The operating pressure in the reaction chamber may be protected from adverse instability from the product gas fuel leaving in its discharge line by passing the product gas fuel through a pressure isolation element. This helps maintain the stable sublimation conditions within the reaction chamber. Pressure isolation elements include, for example, bubblers and cyclones to maintain pressure in the reaction chamber. Alternatively, the pressure in the reaction chamber may be controlled through the product gas fuel being discharged into gas tight holding tanks.

Some embodiments of the system have at least two substantially horizontal reaction chambers that are in communication with each other in series, and the first powered transport mechanism has a part of a shaft that extends outside each reaction chamber and the hot box. Embodiments with more than one reaction chamber in series provide systems able to process higher amounts of carbon-containing feedstock with similar footprints to that of some systems having a single reaction chamber. These embodiments further comprise an adjustable sealing element located outside the hot box at the region of the hot box surrounding a collar about the extended part of the first powered transport mechanism. The adjustable sealing element is configured to prevent the adverse entry from outside the hot box of external oxygen entering the hot box during changing temperatures of startup and shutdown operations, and during steady-state sublimation operation. Leaks that permit oxygen to enter the hot box from the outside or product gas fuel to enter from the reaction chamber can cause undesirably large fluctuations in the operating sublimation temperature. They represent an additional and uncontrolled source of heat when they combust.

Each sealing element comprises an adjustable plate and an adjustable seal to permit satisfactory exclusion of additional undesirable oxygen leaking into the hot box or reaction chamber through undesirable leaks created during thermal expansion and contraction of elements of the system during startup and shutdown operations. The adjustable plate comprises a substantially vertical plate that is adjustably attached to the hot box and configured to vertically move the collar about the extended part of the shaft of the first powered transport mechanism to prevent adverse contact between collar and the shaft. The adjustable seal is in communication with the adjusting plate, located about the extended portion of the shaft of the first powered transport mechanism and comprises a cone and rope configuration designed to maintain a gas-tight seal about the shaft of the first powered transport mechanism as it extends from the hot box.

The residence time in the reaction chamber varies with the nature of the solid carbon-containing feedstock and the quantity being processed. Typically, between at least 50 percent by weight and over 90 percent by weight of solid carbon-containing feedstock can be converted into product gas fuel with the remainder being solid char fuel having an energy density similar to coal. Longer residence times allow more methane units to reassociate from the plasma and may result in a higher conversion to product gas fuel approaching over 70 weight percent to over 90 weight percent. Residence times may range from less than 10 minutes in some embodiments to less than 5 minutes in some embodiments to less than 2 minutes in some embodiments. Excessively long residence times have no adverse effect on the conversion once the theoretical conversion is substantially achieved.

In some embodiments the reactor chambers further comprise manifolds attached to the outside of the reaction chambers within the hot box. The reaction chamber surface and the manifold are configured to allow gaseous plasma to pass between the reaction chamber and the manifold to increase the time the plasma is exposed to sublimation temperatures. In some cases, this additional time may result in plasma gases with longer carbon-carbon chains to further disassociate into methane.

Some embodiments of the system of the invention further comprise a vertical support within the hot box and beneath the substantially horizontal reaction chamber to support is weight during startup, shutdown, and operating conditions where thick reaction chamber walls and support elements such as gussets are not desirable or not feasible to provide adequate support. Generally, the vertical support is configured to be dimensionally stable to within about 2.5 cm (about one inch) in the vertical direction over temperature variations between ambient temperature and about 850° C. that may occur during the startup, operation, and shutdown of the substantially horizontal reaction chamber.

Vertical dimensional stability is achieved by the use of insulation in combination with the use of cooling material flowing through the support in addition to the use of insulation. The cooling material is that commonly associated with cooling and includes, for example, water; refrigerants such as halogenated gas, carbon tetrachloride, chlorofluorocarbons, hydrochlorofluorocarbons, ammonia, carbon dioxide, ethane, propane, ether, and dimethylether; gaseous coolants such as air, hydrogen, inert gases, and sulfur hexafluoride; liquid coolants such as water, ethylene glycol, diethylene glycol, propylene glycol, and FREON by DuPont; and solid coolants such as dry ice.

Cooling materials may pass through or around a vertical support in any manner that maintains the desired vertical dimensional stability. When the vertical support is not cooled, thermal expansions may result in vertical expansions of several inches. This is enough to cause welds in the supported reaction chamber to break and leak product gas fuel into the hot box or out into the environment. As discussed above, this can cause a safety issue and can adversely destabilize the operating temperature profile in the reaction chamber. Some embodiments may have the cooling material pass horizontally along the vertical support walls near the hot reaction chamber that is being supported. Some embodiments may have cooling material flow vertically up into the shaft of the vertical support. Other configurations are also possible as long as they limit vertical thermal expansion sufficiently to not cause leaks in welds in the reaction chamber.

Some embodiments of the system may further comprise a preparation chamber that is outside the hot box. This is useful when carbon-containing feedstock is not supplied in a dried and compressed manner. The preparation chamber is in communication with the substantially horizontal reaction chamber, is configured to remove some free water and oxygen from the solid carbon-containing feedstock, and is configured to compress the solid carbon-containing feedstock into a plug before it enters the substantially horizontal reaction chamber.

The preparation chamber also comprises a second powered transport mechanism that is located partly within the preparation chamber and has a part that extends outside the preparation chamber. The preparation chamber is configured to perform one or more of moving the solid carbon-containing feedstock through the preparation chamber and compressing the solid carbon-containing feedstock within the preparation chamber as it is dried of more free water.

In some embodiments, the preparation chamber is composed of two sub chambers, each with a second powered transport mechanism, the first sub-preparation chamber is configured to remove the bulk of the free water and oxygen from the solid carbon-containing feedstock and the second sub-preparation chamber is configured to remove remaining free water and oxygen from the solid carbon-containing feedstock, and compress the solid carbon-containing feedstock into a plug before it enters the substantially horizontal reaction chamber.

Heat may be supplied internally for the drying function. In some embodiments, the heat used to dry the solid carbon-containing feedstock comes from the combustion gasses in the hot box. In some embodiments, the heat may come from at least one of the hot product gas fuel and the solid char fuel through heat conveyance devices such as, for example, heat exchangers.

In some embodiments, the preparation chamber may be subdivided into a drying chamber and a compression chamber where additional drying may occur. The compression chamber may be equipped with its own second powered transport mechanism. The drying chamber may be equipped with its own third powered transport mechanism. In this embodiment, the drying chamber or pre-preparation chamber is in communication with the compression chamber or preparation chamber and is configured to reduce the particle size of low density solid carbon-containing feedstock to a size and remove the bulk of initial water and trapped air to permit the solid carbon-containing feedstock to be more easily conveyed through the preparation chamber of the system, more easily compressed there without entraining oxygen or water, and more easily heated there to a sublimation temperature without permitting the formation of a liquid phase. In this embodiment, a third powered transport mechanism that precedes and is in communication with the pre-preparation chamber, has a part that extends outside the pre-preparation chamber. The mechanism is configured to perform one or more of moving the solid carbon-containing feedstock through the pre-preparation chamber and compressing the solid carbon-containing feedstock within the pre-preparation chamber in more manageable sized particles.

In both cases, the individual transport mechanisms are to advance solid carbon-containing feedstock forward into a condition for sublimation. One example of a transport mechanism is an augur but others are suitable if they accomplish the desired function.

The system of the invention may further comprise various units to prepare the solid carbon-containing feedstock into a condition to be used by the system of the invention. Various feedstocks must have their size reduced as discussed above to dimensions that can be dried, compressed, and sublimated in a timely manner. By way of illustration, tires must be reduced to tire crumbs and straws or stalks must be reduced to shapes that are more readily conveyed through the preparation chamber of the system, more easily compressed there without entraining oxygen or water, and more easily heated there to a sublimation temperature without permitting the formation of a liquid phase. Units may include, for example, devices that grind, chop, slice, or cut.

FIGS. 1 to 16 illustrate various embodiments of the system described above. The same numbers are used for similar functional elements even if the embodiments are different. FIG. 1 is a diagram of a side view of an embodiment of a system with a single substantially horizontal reaction chamber having one pass. A system (100) is depicted with a hot box (110) containing a vent (112) that surrounds a reaction chamber (120). The vent is needed when the hot box is heated with burners that create combustion products. When heat is generated by other sources of heat, excess gas may not be generated that needs to be vented. Reaction chamber 120 has a surface (121), and contains a first transport mechanism (122), an augur, with a shaft (124). At one end of reaction chamber 120 and extending outside hot box 110 is a front end (130) that solid carbon-containing feedstock enters into thorough an input line (132) with a rotary vacuum valve (134) to isolate any sublimed plasma within the reaction chamber. At the other end of the reaction chamber and extending outside hot box 110 is a back end (140) where product gas fuel exits from a discharge line (142) with a pressure isolation element (144) positioned to isolate any sublimed plasma within the reaction chamber and solid char fuel exits from a discharge line (146) with a rotary vacuum valve (148) positioned to isolate any sublimed plasma within the reaction chamber.

Figure 2:
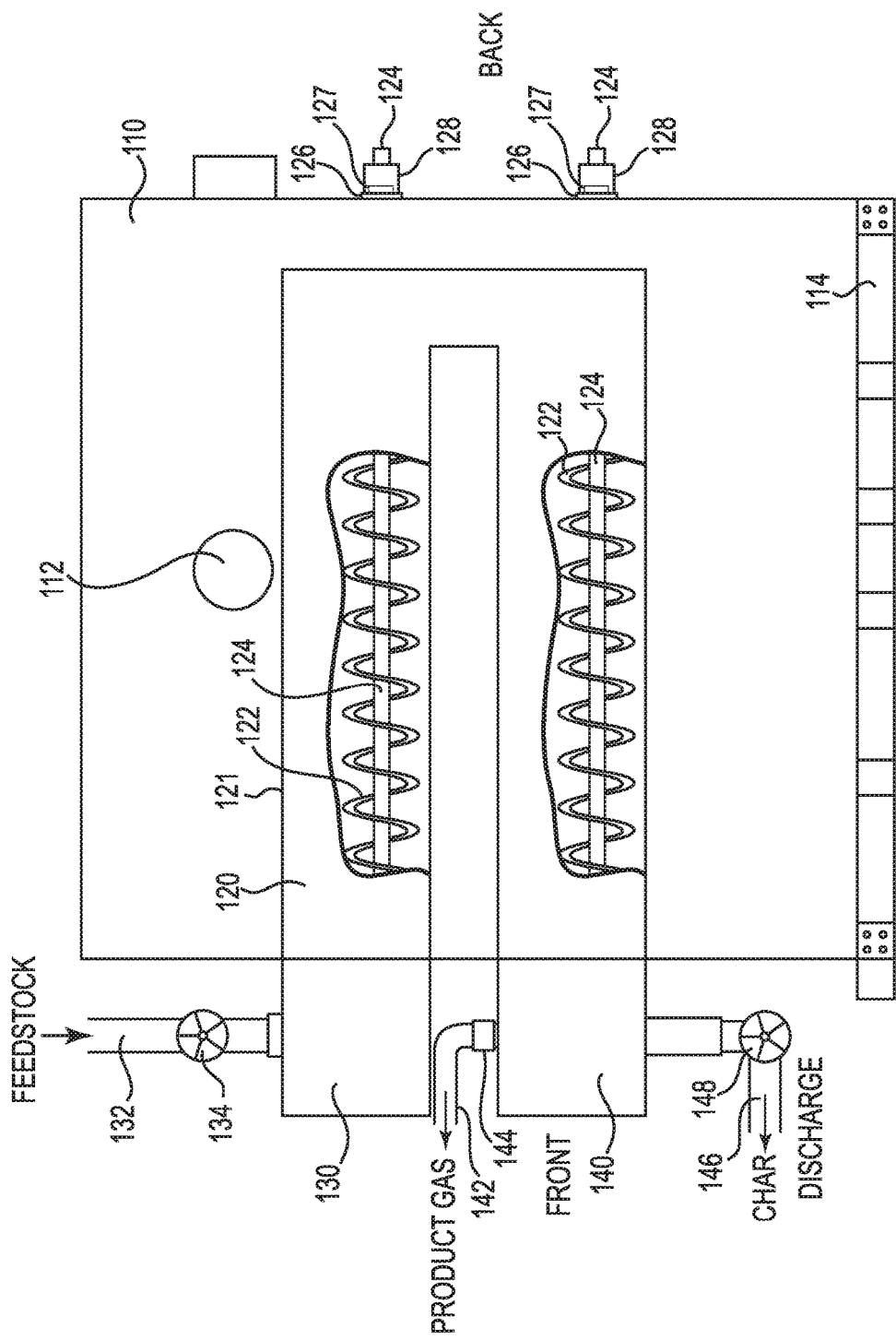
FIG. 2 is a diagram of a side view of an embodiment of a system with a reaction chamber having two passes, a flexible shaft seal, and a high temperature adjustable shaft cover plate.

FIG. 2 is a diagram of a side view of an embodiment of a system with a reaction chamber having two passes, a flexible shaft seal, and a high temperature adjustable shaft cover plate. System 100 is depicted with hot box 110 containing vent 112 that surrounds a reaction chamber 120 and is on a base (114). Reaction chamber 120 with surface 121 is configured like an open "U" on its side with two horizontal passages connected with a vertical passage on the right ends. Each horizontal passage contains first transport mechanism 122, an augur, with a shaft 124. Each shaft extends out of the horizontal passages of reaction chamber 120 and hot box 110. For each shaft end, a high temperature adjustable shaft seal plate (126) encloses each shaft collar (127) and adjustably fastens to the hot box. For each shaft end, an adjustable high temperature seal (128) is fastened on shaft collar 127 at one end and encompasses both a portion of shaft collar 127 and a portion of the extended shaft end of shaft 124. At the end of the first reaction chamber 120 and extending outside hot box 110 is front end 130 into which solid carbon-containing feedstock enters thorough input line 132 with rotary vacuum valve 134 positioned to isolate any sublimed plasma within the reaction chamber. At the end of the second reaction chamber 120 and extending outside hot box 110 is back end 140 where product gas fuel exits from discharge line 142 with cooling element 144 positioned to isolate any sublimed plasma within the reaction chamber and solid char fuel exits from discharge line (146) with rotary vacuum valve (148) positioned to isolate any sublimed plasma within the reaction chamber.

Figure 3:
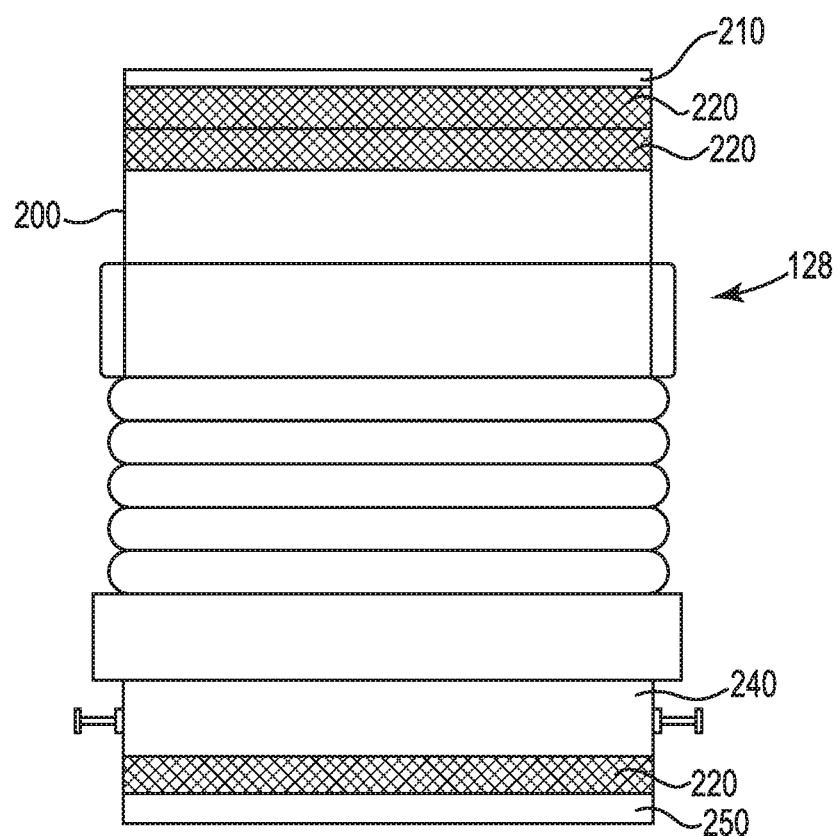
FIG. 3 is a diagram of a side view of an embodiment of a flexible shaft seal casing with the rope seals compressed in place.

The high temperature adjustable seal and plate that is shown in FIG. 2 may have various forms as long as the function is accomplished. One embodiment is illustrated in FIGS. 3 to 10 adjustable shaft seal plate 126. FIG. 3 is a diagram of a side view of an embodiment of a high temperature adjustable shaft seal casing with the rope seals compressed in place. Seal 128 comprises a casing (200) that contains a double rope seal base plate (210) in its front end facing the end of shaft 124. Base 210 is connected to two rope seals (220) to form a double rope seal. This construction is further illustrated in FIG. 4. The backend of casing 200 that faces hot box 110 contains a boltable collar (240) that is configured to affix shaft collar 127 next to single rope seal 220 on a single rope seal base plate (250) that is further illustrated in FIG. 5.

Figure 4:
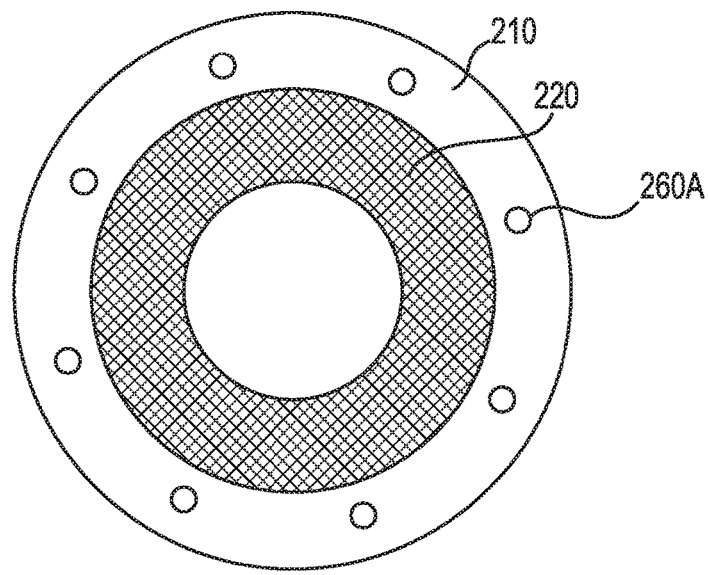
FIG. 4 is a diagram of a view of an element of the embodiment of FIG. 3 showing a back view of the frame holding the double rope seal.

FIG. 4 is a diagram of a view of an element of the embodiment of FIG. 3 showing a back view of the frame holding the double rope seal. The view is one of looking through casing 200 from the end of shaft 124. Bolt holes (260A) are depicted.

Figure 5:
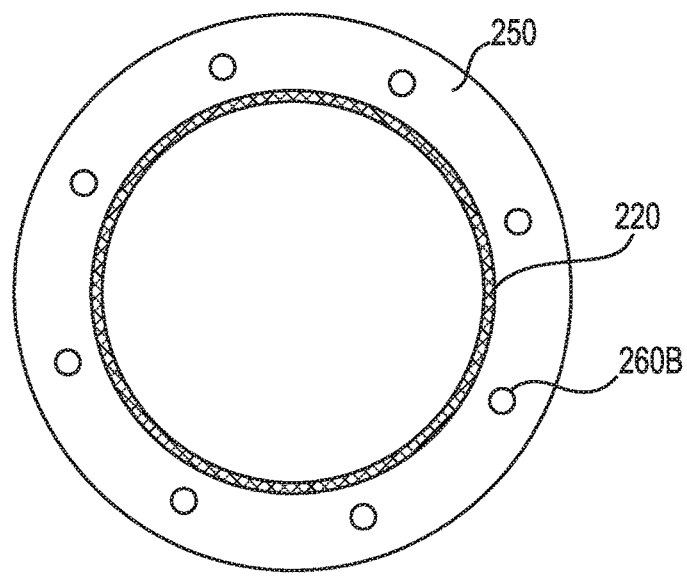
FIG. 5 is a diagram of a view of an element of the embodiment of FIG. 3 showing a back view of the frame holding a single rope seal.

FIG. 5 is a diagram of a view of an element of the embodiment of FIG. 3 showing a back view of the frame holding a single rope seal. The view is one of looking through casing 200 from hot box 110. Bolt holes (260B) are depicted.

FIGS. 6 and 6A are diagrams of a front view and side view respectively of an element of the embodiment of but not shown in FIG. 3 showing a cover that compresses the double rope seal of FIG. 4. The front view is of the side that faces the rope seal. A cover (270) comprises a raised inner compression ring (272) that has a sloping cross-sectional edge attached to an outer support ring (274) with bolt holes 260A. When bolted to the holes of FIG. 4, raised inner compression ring 272 pushes the rope seal inward against the shaft to eliminate adverse leaks of air containing oxygen from entering the hot box during startup and shutdown temperature expansion and contraction cycles.

FIGS. 7 and 7A are diagrams of a front view and side view respectively of an element of the embodiment of but not shown in FIG. 3 showing a cover that compresses the single rope seal of FIG. 5. The front view is of the side that faces the rope seal. A cover (280) comprises a raised inner compression ring (282) that has a square cross-sectional edge attached to an outer support ring (284) with bolt holes 260B. When bolted to the holes of FIG. 5, raised inner compression ring 282 pushes the rope seal downward against seal collar 240 to eliminate adverse leaks of air containing oxygen from entering the hot box during startup and shutdown temperature expansion and contraction cycles.

FIGS. 8A and 8B are diagrams of the front view and side view respectively of an embodiment of the high temperature adjustable cover plate showing a top half. The upper half (310) of high temperature adjustable seal plate 126 comprises two adjustable holes (312), connecting holes (314), and a semicircular opening (316) designed to fit around half of shaft collar 127. The cross-section (318) is straight.

FIGS. 8C and 8D are diagrams of the front view and side view respectively of the embodiment of the high temperature adjustable cover plate of FIGS. 8A and 8B showing a bottom half. The lower half (320) of high temperature adjustable seal plate 126 comprises two adjustable holes (322), connecting holes (324), a semicircular opening (326) designed to fit around half of shaft collar 127, and a step plate (325) that contains connecting holes 324 to permit a smooth surface to contact the hot box when assembled. The cross-section (328) is stepped.

FIG. 8E is a diagram of the front view of the embodiment of the high temperature adjustable cover plate of FIGS. 8A and 8B showing the top half of FIGS. 8A and 8B and the bottom half of FIGS. 8C and 8D joined.

FIGS. 9A and 9B are diagrams of the front view and the side view respectively of the assembled high temperature adjustable cover plate in the cold temperature position. As seen, because hot box 110 has not yet experienced thermal expansion, shaft 124 exits hot box 110 through collar 127 at a lower position to avoid adversely having collar 127 contact shaft 124 during operation.

FIGS. 10A and 10B are diagrams of the front view and the side view respectively of the assembled high temperature adjustable cover plate in the hot temperature position. As seen, because hot box 110 has thermally expanded in an upward manner during start-up heating operations, collar 127 must be moved upward to avoid adversely contacting shaft 124 during operation. Adjustable holes 312 and 322 permit such adjustment. Some embodiments use manual adjustment. Some embodiments use automated adjustment.

Figure 11:
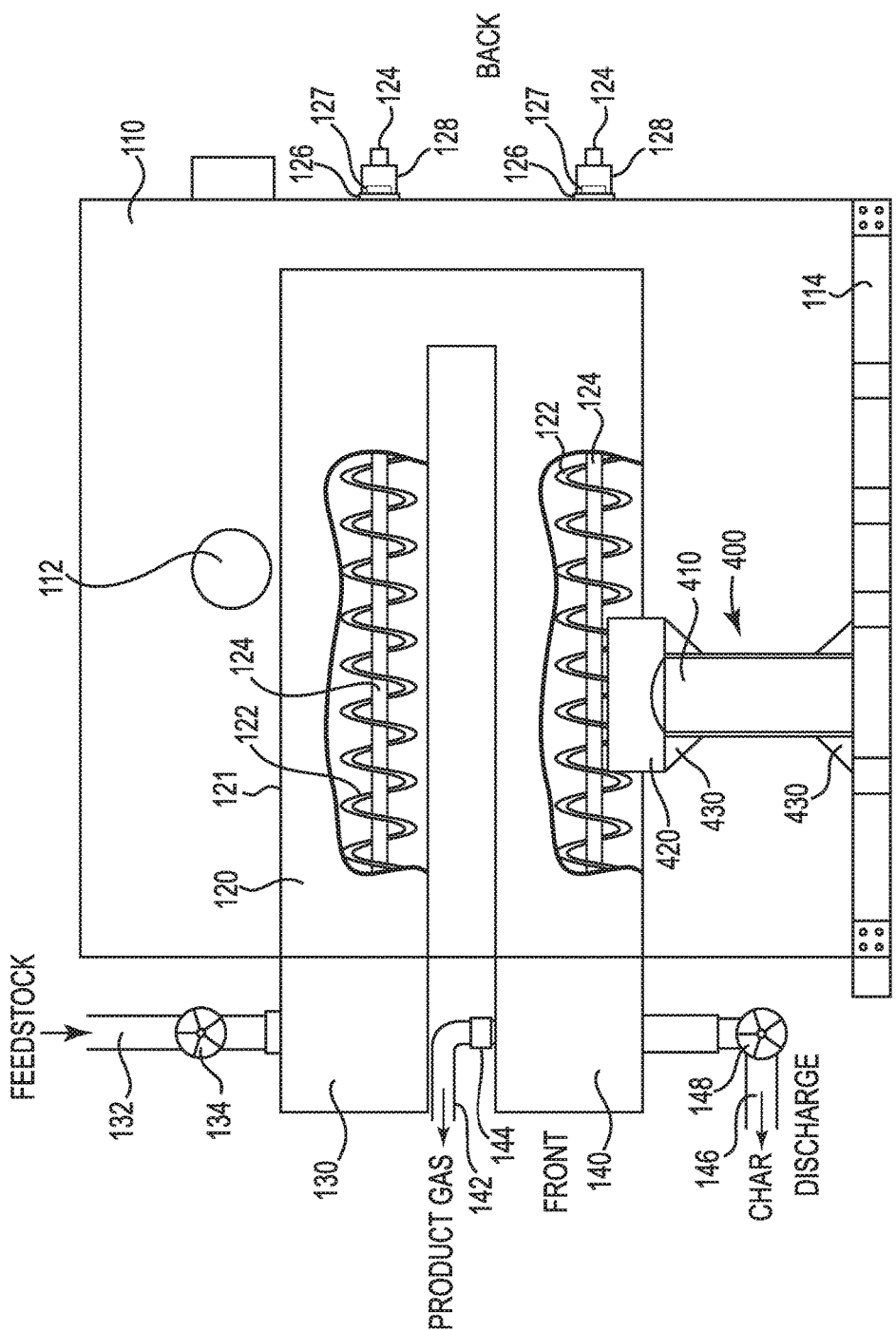
FIG. 11 is a diagram of a side view of an embodiment of a system with a reaction chamber having two passes, a flexible shaft seal, a high temperature adjustable shaft cover plate, and a high temperature vertical support.

FIG. 11 is a diagram of a side view of an embodiment of a system with a reaction chamber having two passes, a flexible shaft seal, a high temperature adjustable shaft cover plate, and a vertical support. This embodiment is similar to the embodiment shown in FIG. 2 except a high temperature vertical support (400) is used to support reaction chamber 120 within hot box 110. Vertical support 400 comprises a vertical support shaft (410) and a cradle (420) to hold reaction chamber 120. The stability of the vertical support shaft and cradle configuration is reinforced with gussets (430) attaching vertical support shaft 410 to cradle 420 and vertical support shaft 410 to system base 114.

Figure 12:
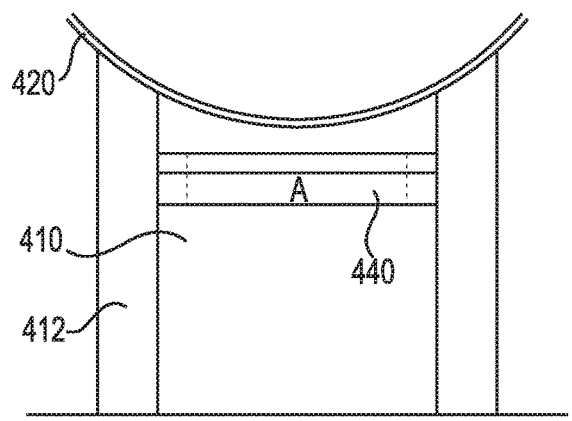
FIG. 12 is a front view of an embodiment of a vertical stand showing a curved cradle and a horizontal ring for passing coolant.

The high temperature vertical support stand that is shown in FIG. 11 may have various forms as long as the function is accomplished. One embodiment is illustrated FIGS. 12 and 13. A variation of that embodiment is illustrated in FIG. 14. FIG. 12 is a front view of an embodiment of a vertical stand showing a curved cradle and a horizontal ring for passing coolant. The cradle is designed to conform to the bottom of reaction chamber 120. In embodiments of the system where the bottom of reaction chamber 120 is other than curvature, a different conforming shape of the cradle would be employed. Vertical stand 410 is surrounded with insulation (412). However, heat passing from reaction chamber 120 through cradle 420 to vertical support shaft 410 can cause adversely large vertical thermal expansion of vertical support shaft 410 as discussed above. A cooling ring (440) horizontally displaced within the upper part of vertical support shaft 410 can be used to minimize thermal expansion of vertical support shaft 410 to satisfactory lengths over the ranges of temperatures employed by the apparatus as discussed above.

Figure 13:
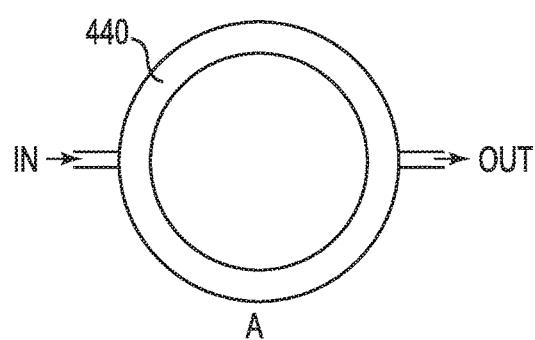
FIG. 13 is a top view of the embodiment of FIG. 12 showing the cooling ring.
Figure 14:
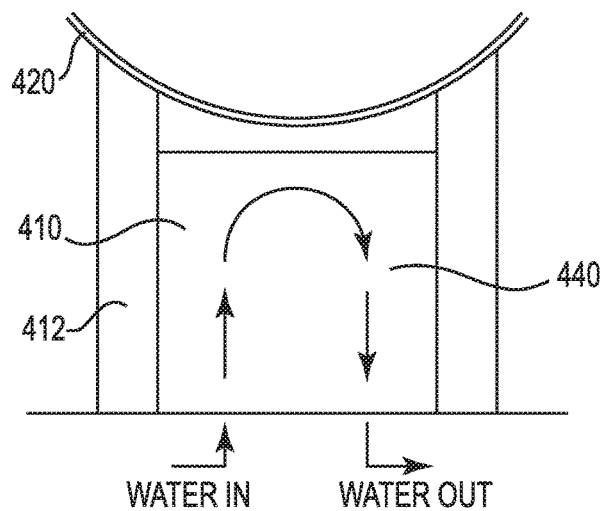
FIG. 14 is a front view of an embodiment of a vertical stand showing a curved cradle and a vertical up and down cooling passage within the vertical shaft of the vertical stand.

FIG. 13 is a top view of the embodiment of FIG. 12 showing cooling ring 440.

FIG. 14 is a front view of an embodiment of a vertical stand showing a curved cradle and a vertical up and down cooling passage within the vertical shaft of the vertical stand.

Figure 15:
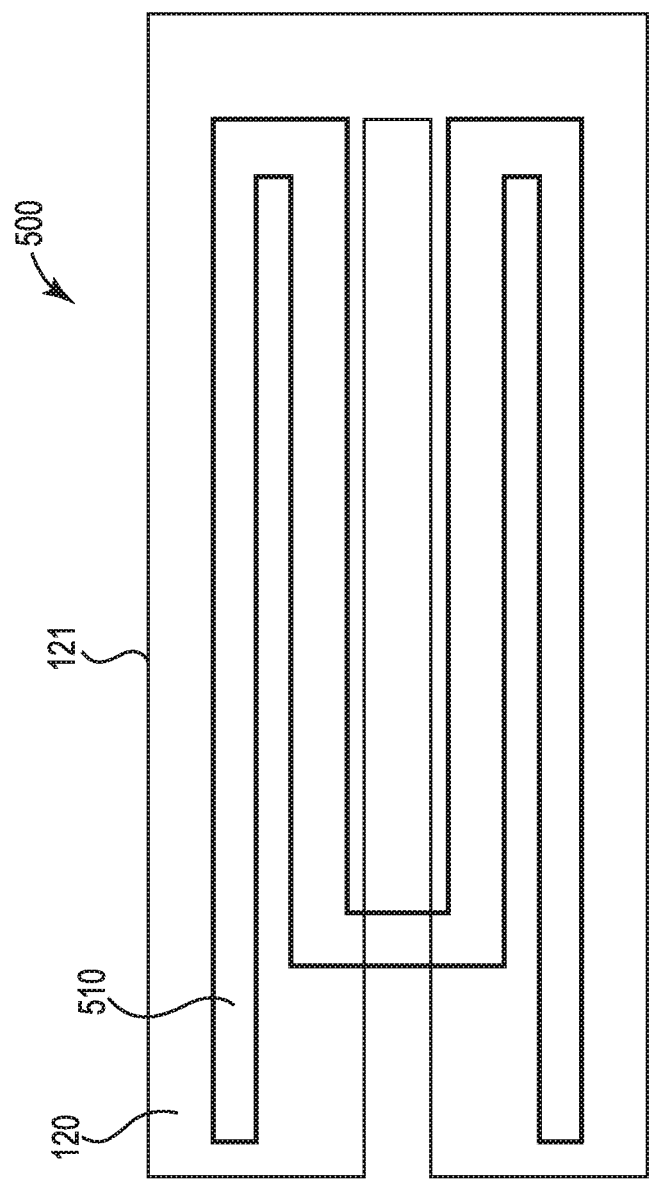
FIG. 15 is a diagram of a side view of an embodiment of a system with a reaction chamber having two passes and a four-pass bypass manifold attached to the outside of the reaction chamber to increase residence time.

FIG. 15 is a diagram of a side view of an embodiment of a system with a reaction chamber having two passes and a four-pass bypass manifold attached to the outside of the reaction chamber to increase residence time. The system (500) comprises a bypass manifold (510 that is in communication with the plasma within reaction chamber through apertures (not shown) in the surface (121) of the reaction chamber and manifold where they connect. This permits the plasma to experience extended residence times where appropriate for desired conversion of solid carbon-containing feedstock into product gas fuel and solid char fuel.

Figure 16:
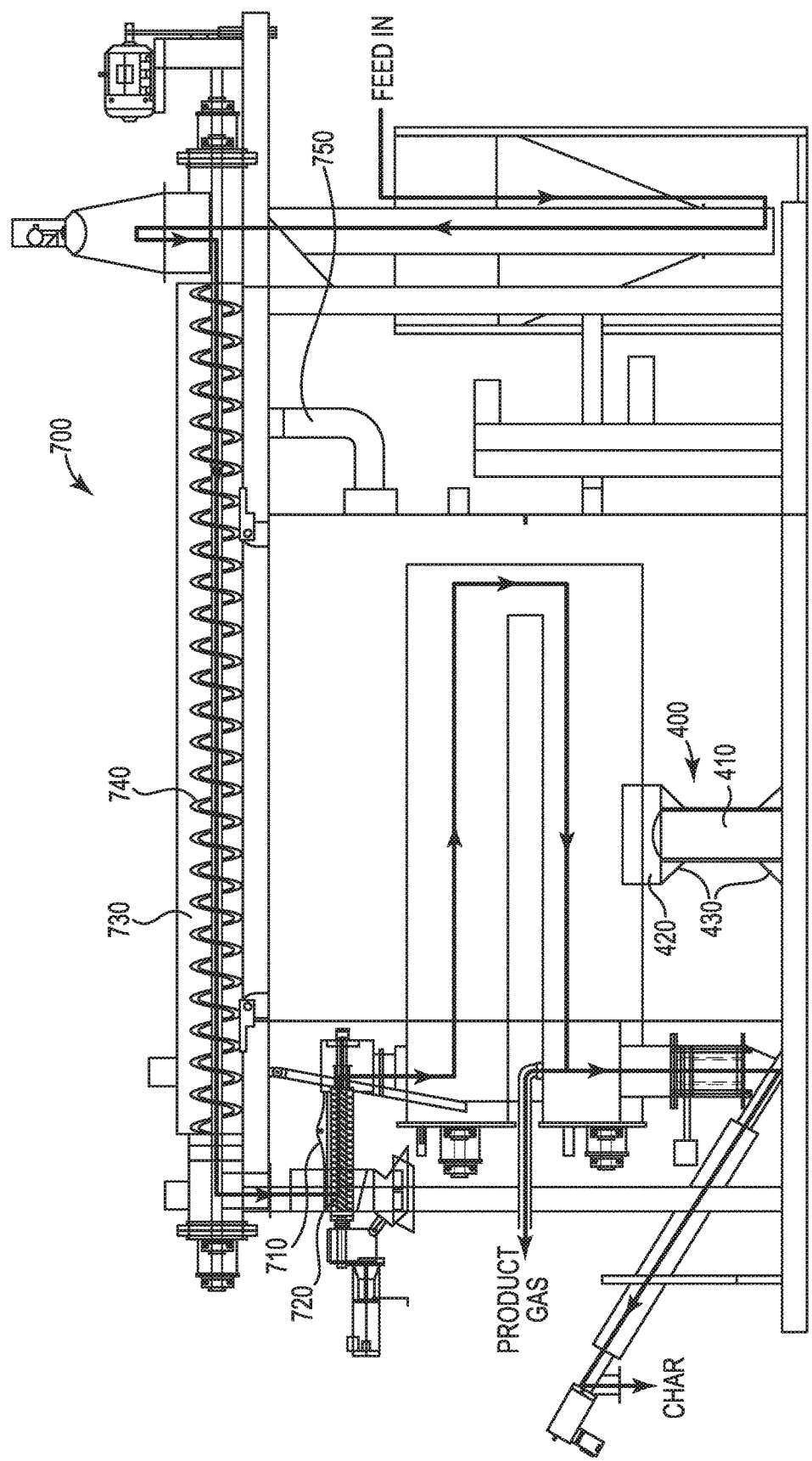
FIG. 16 is a diagram of a side view of an embodiment of a system with a reaction chamber having two passes, a compression chamber, and a drying chamber.

FIG. 16 is a diagram of a side view of an embodiment of a system with a reaction chamber having two passes, a compression chamber, and a drying chamber. This system is similar to that shown in FIG. 6 with additional processing cambers. The passage of material as it enters and progresses through the system until it exits as product fuel is shown by a heavy line. System 700 comprises a preparation chamber (710) for compressing carbon-containing feedstock into a plug prior to entry into the front end 130 of the reaction chamber. A second powered transport mechanism (720) is inside the chamber to accomplish the compression. Some additional drying may also occur here. A pre-preparation chamber (730) is in communication with the preparation chamber 710 with a third powered transport mechanism (740) to convey the solid carbon-containing feedstock in a heated environment to dry the feedstock. A channel (750) is used to funnel hot combustion gases from the hot box into the pre-preparation chamber to assist in part or all of this drying.

Another embodiment of the invention involves a process for converting a carbon-containing compound to product gas fuel and solid char fuel. The process comprises at least four steps. The first step is inputting solid carbon-containing feedstock into a substantially horizontal sublimating reaction chamber largely contained within a hot box and configured to be able to heat from an ambient temperature to an operating sublimation temperature, operate at a sublimation temperature, and cool from a operating sublimation temperature to an ambient temperature without leaking any hot product gas fuel from the reaction chamber into the hot box or atmosphere, or leaking any oxygen from outside the hot box into the hot box. The second step is heating solid carbon-containing feedstock to a sublimating temperature before it is able to form a liquid phase. The third step is maintaining the temperature at a sublimation temperature for a residence time that is as long a time as needed to convert the carbon-containing feedstock to product gas fuel and solid char fuel. The fourth step is separating the product gas fuel from the solid char fuel.

Heat generated by the process may be used in various ways. Some embodiments may use direct heated combustion gases from the hot box to a pre-preparation chamber to dry the solid carbon-containing feedstock before it enters a preparation chamber for compression, if needed, and a sublimation chamber. Some embodiments may use the heat for other purposes such as heating buildings.

Heat used to sublimate the feedstock may be supplied by combusting part of the product fuel gas. Sublimation temperatures can be maintained with a small fraction of the product gas fuel being used as fuel for burners as discussed above.

Figure 17:
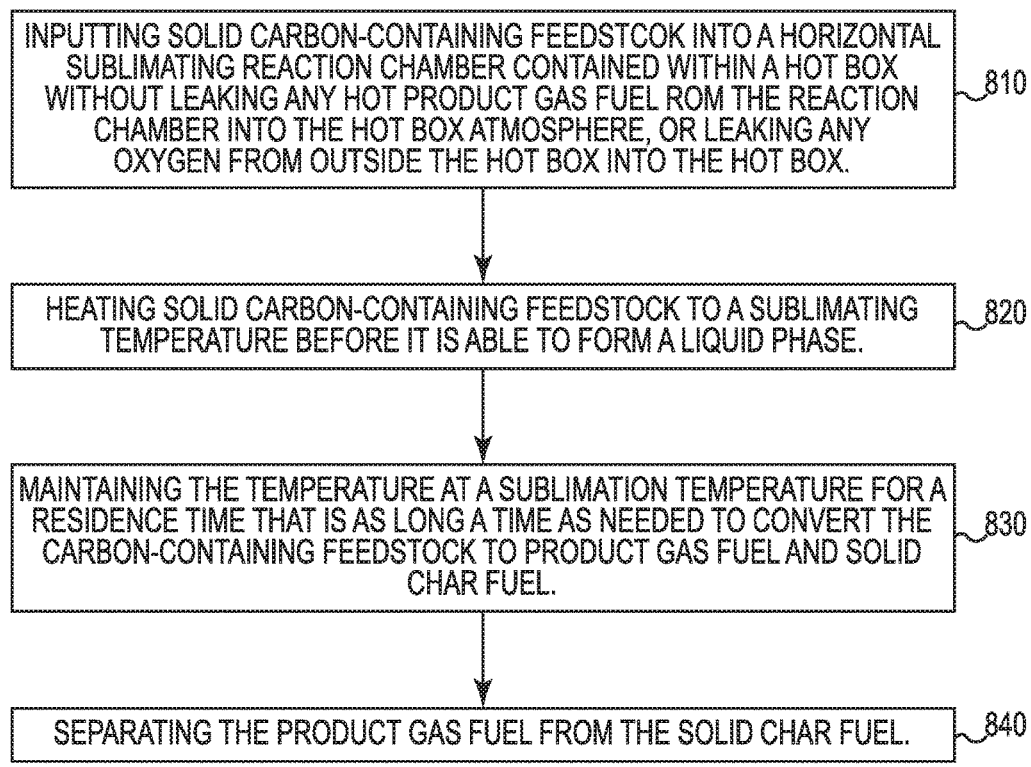
FIG. 17 is a flow diagram of a process for generating fuel from carbon-containing feedstock in accordance with embodiments of the invention.

FIG. 17 is a flow diagram of a process for generating fuel from carbon-containing feedstock in accordance with embodiments of the invention. In 810 the solid carbon-containing feedstock is inputted into a horizontal sublimating reaction chamber contained within a hot box without leaking any hot product gas fuel from the reaction chamber into the hot box or atmosphere, or leaking any oxygen from outside the hot box into the hot box. Next, in step 820, the solid carbon-containing feedstock is heated to a sublimating temperature before it is able to form a liquid phase. In step 830, the temperature is maintained at a sublimation temperature for a residence time that is as long a time as needed to convert the carbon-containing feedstock to product gas fuel and solid char fuel. Finally, in step 840 the product gas fuel and the solid char fuel are separated from each other.

Various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A process for converting a carbon-containing compound to product gas fuel and solid char fuel, comprising:
    inputting solid carbon-containing feedstock into a substantially horizontal sublimating reaction chamber largely contained within a hot box and configured to be able to heat from an ambient temperature to an operating sublimation temperature, operate at a sublimation temperature, and cool from a operating sublimation temperature to an ambient temperature without leaking any hot product gas fuel from the reaction chamber into the hot box or atmosphere, or leaking any oxygen from outside the hot box into the hot box wherein the substantially horizontal reaction chamber comprises two or more horizontal passages in communication with each other in series, and the first powered transport mechanism has a part of a shaft that extends outside each horizontal passage and the hot box, the system, further comprising an adjustable sealing element located outside the hot box at the region of a hot box surrounding a collar about the extended part of the shaft of the first powered transport mechanism and configured to prevent the adverse entry from outside the hot box of external oxygen entering the hot box during changing temperatures of startup and shutdown operations, and during steady-state sublimation operation;
    heating solid carbon-containing feedstock to a sublimating temperature before it is able to form a liquid phase;
    maintaining the temperature at a sublimation temperature for a residence time that is as long a time as needed to convert the carbon-containing feedstock to product gas fuel and solid char fuel; and
    separating the product gas fuel from the solid char fuel.

2. The process of claim 1, wherein the substantially horizontal sublimating reaction chamber is supported by a vertical support that is beneath the substantially horizontal reaction chamber and is configures to be dimensionally stable in the vertical direction over temperature variations of from ambient temperature to about 850° that may occur during the startup, operating, and shutdown operations of the substantially horizontal reaction chamber.

3. The process of claim 1, wherein the solid carbon-containing feedstock that is introduced into the substantially horizontal sublimating reaction chamber contains no external catalyst and minimal free water.

4. The process of claim 1, wherein the residence time is less than ten minutes.

5. The process of claim 1, wherein the residence time is less than five minutes.

6. The process of claim 1, wherein the residence time is less than two minutes.

7. The process of claim 1, wherein the operating sublimation temperature of the reactor is between 600° C. and 850° C.

8. The process of claim 1, wherein the time the solid carbon-based feedstock takes to reach the operating sublimation temperature in the reactor chamber is less than 0.001 seconds.

9. The process of claim 1, further comprising the step of:
directing a portion of the product gas fuel to fuel a heat source that heats the reaction chamber to the operating sublimation temperature.

10. The process of claim 1, further comprising the step of:
directing a portion of contents of the hot box to heat the solid carbon-based feedstock to remove free water before the solid carbon-based feedstock enters the reaction chamber.

11. The system of claim 1, wherein the solid carbon-containing feedstock, comprises renewable feedstocks selected from one or more of wheat straw, rice straw, energy crops, grasses, stalks and stems of plants, crop residue, plant-based cellulose, tree branches, and animal waste.

12. The system of claim 1, wherein the feedstock comprises non-renewable feedstocks selected from peat and industrial product waste, one or more of plastics, tire crumbs, and manufactured elements made at least in part of wood or other cellulosic material.

13. A system for producing fuel from a solid carbon-containing feedstock, comprising:
a hot box configured to be able to heat from an ambient temperature to an operating sublimation temperature, maintain an initial operating sublimation temperature and a final operating sublimation temperature that are stable within less than ±10° C., and cool from operating sublimation temperatures to an ambient temperature without leaking any oxygen into the hot box and having at least one heat source in communication with the interior of the hot box to supply heat as needed;
a substantially horizontal reaction chamber largely located within the hot box, having a surface, configured to heat the solid carbon-containing feedstock without external catalyst or additional water to an operating sublimation temperature in a time frame that is short enough to sublime at least part of the solid carbon-containing feedstock without creating substantially any liquid, configured to heat from an ambient temperature to an operating sublimation temperature, operate at a sublimation temperature, and cool from a operating sublimation temperature to an ambient temperature without leaking any product gas fuel into the surrounding hot box, and comprising an input end outside the hot box and configured to receive compressed feedstock through an input line and an output end outside the hot box and configured to discharge product gas fuel gas through a discharge line and solid char fuel through an output line;
a first powered transport mechanism that is located within the reaction chamber and is configured to convey sublimation products of the solid carbon-containing feedstock through the reaction chamber as the solid carbon-containing feedstock is transformed into product gas fuel and solid char fuel; and
a gas-tight element on both the input line and output line and configured to prevent hot product fuel gas from adversely escaping from the reaction chamber,
wherein the substantially horizontal reaction chamber comprises two or more horizontal passages in communication with each other in series, and the first powered transport mechanism has a part of a shaft that extends outside each horizontal passage and the hot box, the system, further comprising:
an adjustable sealing element located outside the hot box at the region of a hot box surrounding a collar about the extended part of the shaft of the first powered transport mechanism and configured to prevent the adverse entry from outside the hot box of external oxygen entering the hot box during changing temperatures of startup and shutdown operations, and during steady-state sublimation operation.

14. The system of claim 13, wherein the adjustable sealing element comprises
an adjustable plate comprising a substantially vertical plate adjustably attached to the hot box and configured to vertically move the collar about the extended part of the shaft of the first powered transport mechanism to prevent adverse contact between the collar and the extended part of the shaft, and
an adjustable seal in communication with the adjustable plate, located about the extended part of the shaft of the first powered transport mechanism and comprises a cone and rope configuration designed to maintain a gas-tight seal about the shaft of the first powered transport mechanism as it extends from the hot box.

15. The system of claim 13, wherein the reaction chamber further comprises manifolds attached to the outside of the reaction chamber within the hot box and configured to allow gaseous plasma to pass between the reaction chamber and the manifold to increase the time the plasma is exposed to sublimation temperatures.

16. The system of claim 13 wherein the discharge line further comprises a pressure isolation element.

17. The system of claim 13, wherein the hot box, further comprises a vertical support, the vertical support comprising a vertical support shaft and a cradle to hold the substantially horizontal reaction chamber,
wherein the vertical shaft is attached to the cradle and to a system base, and
wherein the vertical support shaft is configured to be dimensionally stable to within 2.5 cm (one inch) in the vertical direction over temperature variations between ambient temperature and about 850° C.

18. The system of claim 17, wherein the vertical support shaft comprises a cooling ring horizontally displaced within the shaft, the cooling ring comprising a material flowing through the cooling ring.

19. The system of claim 13, further comprising
a preparation chamber that is outside the hot box, precedes and is in communication with the substantially horizontal reaction chamber, is configured to remove free water and oxygen from the solid carbon-containing feedstock, and is configured to compress the solid carbon-containing feedstock into a plug before it enters the substantially horizontal reaction chamber; and
a second powered transport mechanism that is located partly within the preparation chamber, has a part that extends outside the preparation chamber and is configured to perform one or more of moving the solid carbon-containing feedstock through the preparation chamber and compressing the solid carbon-containing feedstock within the preparation chamber as it is dried of free water.

20. The system of claim 19 wherein the preparation chamber is composed of two sub chambers, each with a second powered transport mechanism, the first sub-preparation chamber is configured to remove the bulk of the free water and oxygen from the solid carbon-containing feedstock and the second sub-preparation chamber is configured to remove remaining free water and oxygen from the solid carbon-containing feedstock, and compress the solid carbon-containing feedstock into a plug before it enters the substantially horizontal reaction chamber.

21. The system of claim 19, wherein the solid carbon-containing feedstock has a particle size and further comprising:
a pre-preparation chamber in communication with the preparation chamber and configured to reduce the particle size of the solid carbon-containing feedstock to a size that is more easily conveyed through the preparation chamber of the system, more easily compressed there without entraining oxygen or water, and more easily heated there to a sublimation temperature without permitting the formation of a liquid phase; and
a third powered transport mechanism that precedes and is in communication with the pre-preparation chamber, has a part that extends outside the pre-preparation chamber and is configured to perform one or more of moving the solid carbon-containing feedstock through the pre-preparation chamber and compressing the solid carbon-containing feedstock within the pre-preparation chamber in more manageable sized particles.

22. The system of claim 21, wherein the particle size has a volume that is less than the equivalent of a cube 1.8 cm (¾ inch) on a side and a length in any one direction of no more than 5 cm (2 inches).

* * * * *